July 12, 1966  D. ARONSON  3,260,066
HEAT EXCHANGE MEANS FOR AN ABSORPTION REFRIGERATION SYSTEM
Filed Dec. 1, 1964  4 Sheets-Sheet 1

DAVID ARONSON
*INVENTOR.*

DAVID ARONSON
INVENTOR.

BY Daniel H. Bobis
Atty

July 12, 1966     D. ARONSON     3,260,066
HEAT EXCHANGE MEANS FOR AN ABSORPTION REFRIGERATION SYSTEM
Filed Dec. 1, 1964     4 Sheets-Sheet 3

DAVID ARONSON
*INVENTOR.*

BY Daniel H. Bobis
Atty.

July 12, 1966 D. ARONSON 3,260,066
HEAT EXCHANGE MEANS FOR AN ABSORPTION REFRIGERATION SYSTEM
Filed Dec. 1, 1964 4 Sheets-Sheet 4
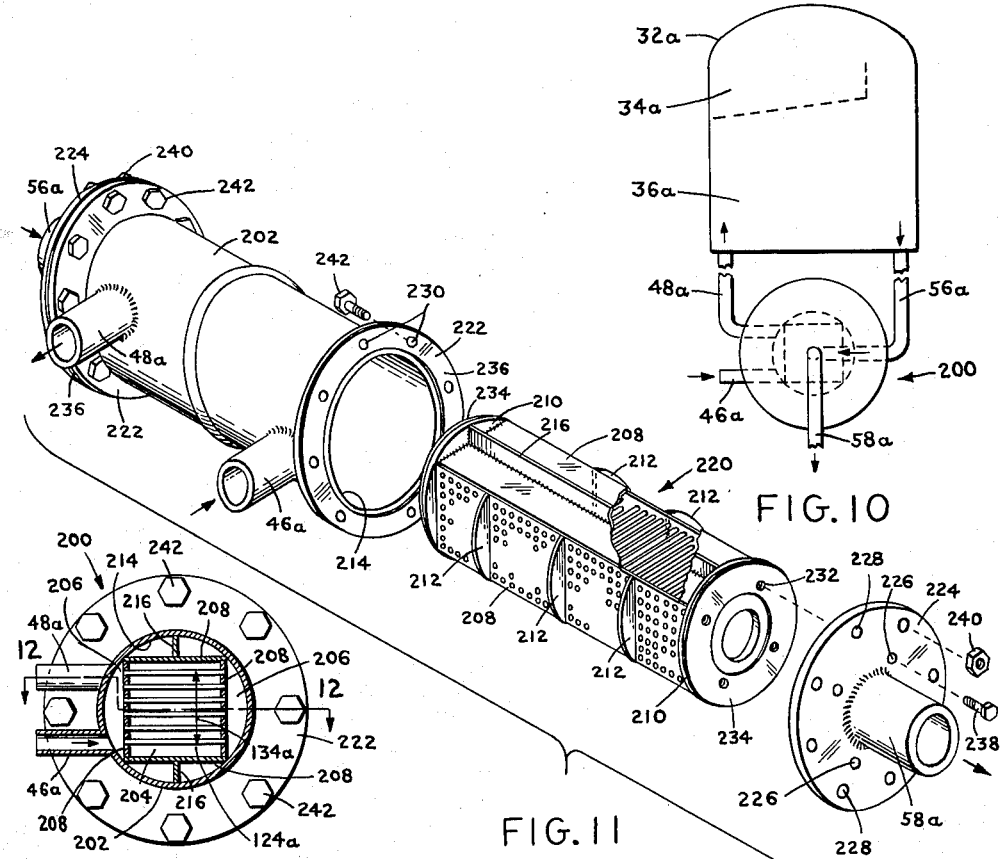
FIG. 10
FIG. 11
FIG. 13
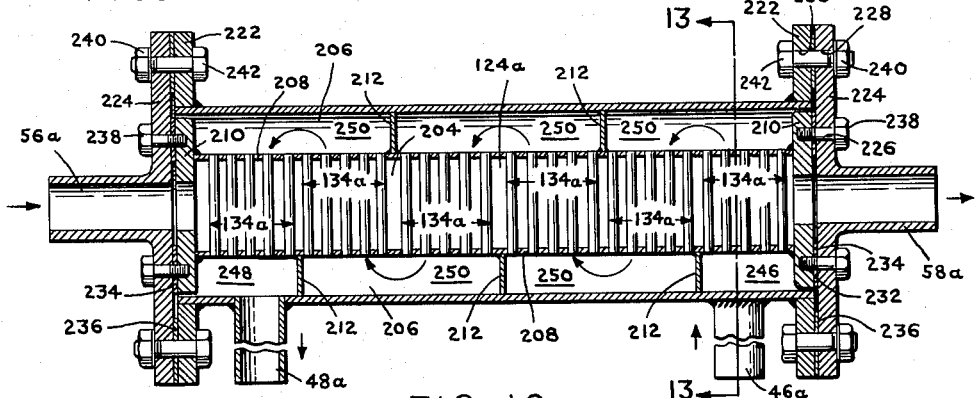
FIG. 12
DAVID ARONSON
INVENTOR.
BY Daniel H. Bobis
Atty 3,260,066
Patented July 12, 1966

3,260,066
HEAT EXCHANGE MEANS FOR AN ABSORPTION
REFRIGERATION SYSTEM
David Aronson, Upper Montclair, N.J., assignor to
Worthington Corporation, Harrison, N.J., a corporation
of Delaware
Filed Dec. 1, 1964, Ser. No. 415,121
7 Claims. (Cl. 62—489)

This invention relates generally to an absorption refrigeration system. More particularly, the invention relates to an improved heat exchange means for use in an absorption refrigeration system or the like.

While applicable for general use, the novel heat exchange means is especially adapted for use where one of the fluids passing in indirect heat exchange relation therein is in a state of streamline or laminar flow. Furthermore the novel heat exchange means includes provisions for subcooling of steam condensate therein.

Since there is more than one state of flow it will be helpful to distinguish and define them as was done in "Heat Transfer," by Max Jakob, on page 421, published in 1949 as follows:

"Flow and temperatures are the main characteristics of heat convection. Experience has shown that two different patterns of flow occur. Considering, for instance, the flow of a fluid through a straight tube, it is known that, at sufficiently small velocity, the fluid moves in axial direction only. In this and related cases one speaks of laminar or streamline flow. Under certain conditions, in particular, when the velocity is increased and reaches an amount fixed by the kinematic viscosity of the fluid and the configuration of the walls, mixing of the fluid layers occurs, because of an oscillatory motion of the particles normal to the main flow direction. This kind of flow is called turbulent flow. Except for a transitory stage, the flow is well defined, although the details of its mechanism are not fully recognized as yet.

"The heat transfer under laminar flow conditions is mainly due to the thermal conduction, i.e., to the molecular heat exchange between the layers of the fluid. The heat transfer in turbulence, on the other hand, is mainly due to the oscillatory motions of super-molecular portions of the fluid; heat energy is carried to and fro by such particles, and the thermal conductivity plays a secondary role only in this mechanism. It is not surprising that the heat transfer is better, often of a higher order of magnitude than that in streamline flow. One of the dominating methods used is to split the field of heat transfer into a turbulent section, which is supposed to exist in the bulk of the fluid, and a streamline layer close to the walls."

Other factors which may affect the efficiency of the heat transfer are:

(1) The $L/D$ ratio, where L is the length of the tubes and D is the diameter of the tubes of a tube bundle used in the heat exchanger; and (2) Velocity of the respective fluids flowing in indirect heat exchange relationship through the tube side and shell side of the heat exchanger.

Heretofore, prior art systems endeavor to improve heat transfer by using surface interruptions to break up the boundary layer flow of fluids which occurs at laminar flow by the use of internal fins in the tubes, or by using a smaller $L/D$ ratio through the use of a larger diameter tube for a given length of tube. A further technique has been to use a heat exchanger which required a plurality of passes through longitudinally extending tube bundles but this involved costly dividing members within the heat exchanger and generally resulted in a complex structure. It is apparent that the prior art solutions have severe limitations and have been generally unsatisfactory due to design and available space consideration, cost and reliability.

In addition to the above set forth problems, when the heat exchange means is used in a system such as an absorption refrigeration system, further difficulties are encountered. Among these are:

(1) Due to the fact that the absorption refrigeration system circulates a brine solution of varying concentrations, there exists a possibility of the solution crystallizing on being cooled thus plugging or blocking the flow path through the system; and (2) Pressure drops in the heat exchange means must be kept within design limitations, which are exceptionally low.

In addition to subcooling the steam condensate the present invention is concerned primarily with the means of obtaining the highest rate of heat transfer for a given amount of fluid pumping power in heat transfer systems in which one fluid is passing through the inside of a tube or passageway of substantially constant and uniform cross-section. As noted previously this invention is of advantage especially for conditions of streamline or laminar flow wherein this invention markedly improves heat transfer rates for fluids flowing inside passageways at Reynolds numbers less than 10,000. Further the novel heat exchange means also offers a number of technical advantages from a manufacturing or process standpoint.

While a more technical description may be found in "Heat Transmission" by William H. McAdams, 2d ed., 1942, or "Heat Transfer," supra, for purposes of understanding the present invention the Reynolds number can be defined as a modulus or a ratio which characterizes the nature of the fluid flow. At low values of Reynolds number the flow of a fluid through a straight tube or passageway is such that the fluid moves solely in a direction parallel to the axis of the tube, and such a flow pattern is referred to as streamline or laminar flow. At higher values of Reynolds number, which occur as the diameter of the passageway or the velocity of flow, or both are increased, or the viscosity of the fluid is decreased, the flow pattern changes. Mixing of the fluid layers occurs, because there is an appreciable movement of fluid particles normal to the direction of the main flow. As a result of this mixing of the fluid, the heat transfer rate is appreciably higher than is the case for streamline or laminar flow where no such mixing occurs.

At Reynolds numbers of less than 10,000 for fluids flowing inside a tube bundle the overall heat transfer performance can be improved by the introduction of some mechanism for mixing of the fluid which otherwise tends to flow largely in layers parallel to the axis of the tube or channel. Such mechanisms may consist of blunt objects placed in the flow path, or of fluting, rifling, or otherwise creating a non-linear component to the main stream. However, this approach may be undesirable for any number of reasons, such as cost, increased pressure loss, mechanical weaknesses, etc.

On the other hand an extremely simple mechanism for improving heat transfer is the increase of the diameter to length ratio of the tube or passageway. Heat transfer will improve about as the 1/3rd power of the increase of diameter to length ratio.

This increase can be effected by increasing the diameter or by reducing the length. Increasing the diameter is disadvantageous as it leads to a larger heat exchanger, which generally means increased cost and weight. Accordingly reducing the length is the means employed in the present invention. Heretofore such reduction in length was not practically possible. But through the teachings of this invention such a construction is obtainable in a simple, practical way—essentially by setting the tube sheet of the heat exchanger in a plane parallel with the axis of the heat exchanger, as compared with the prior art of having the tube sheet perpendicular to the axis of the heat exchanger. In this invention, then the tubes may be disposed at right angles to the axis of the heat exchanger, which gives a further advantage that the shell side fluid can pass cross-wise to the tubes and yet flow essentially parallel to the heat exchanger axis and avoid the losses common to multi-pass shell side flow where the shell side fluid must reverse its direction of flow at each pass.

Accordingly, it is an object of the present invention to provide a heat exchange means for embodiment in a system, such as an absorption refrigeration system, which overcomes the above designated prior art difficulties; which can operate effectively in providing efficient rates of heat transfer in regions of laminar flow; which permit the use of a smaller diameter tube than in other heat exchangers without loss in heat transfer performance; which eliminates the need for intermediate tube support sheets, heretofore required; which has a single path of the shell side fluid so as to utilize the pressure drop occurring therein to give the best heat transfer; which permits the tube side members to extend transversely through the shell side and make a plurality of passes essentially constituting a path counter to that of the shell side fluid; which permits the use of tubes having a favorable $L/D$ ratio; which permits the tube side tube bundles to transversely cross the shell side a predetermined number of passes.

Another object of this invention is to provide an integrally formed heat exchange means and generator divided by a suitable partition; which combination prevents crystallization of the saline solution as heat is supplied therein especially on shut-down and start-up where non-moving solution can be maintained in fluid condition; and which provides a simple, reliable, less expensive, and compact shell.

Another object of this invention is to provide an improved heat exchanger for use in an absorption refrigeration system in which the weak solution coming from the absorber and passing to the generator is pre-heated by the strong solution coming from the generator and passing to the absorber; in which steam condensate from the generator may be sub-cooled therein to utilize the sensible heat of the condensate and lower the temperature thereof to both save on steam and avoid flashing of the condensate; in which the sub-cooling of said condensate will take place in indirect heat exchange relationship within the heat exchanger; in which the sub-cooling of said condensate will take place in the shell side of the heat exchanger, and by providing sub-cooling of the condensate to thereby avoid the need for steam traps.

Still another object of this invention is to provide a novel heat exchange means which uses weirs in the shell side thereof to act as vapor barriers and prevent flashing and vapor by-pass from the strong solution, especially in the area of the inlet; which weirs allow for variation in the liquid level at the inlet and outlet end of the shell side due to any unbalance of pressure caused by pressure gradient or demands on the system; and which weirs increase the mixing and prevent stratification of the strong solution into different temperature zones.

While other objects and advantages will be apparent from the following description of several embodiments of the invention and the novel features will be particularly pointed out hereafter in the claims; reference being had to the accompanying drawings forming a part of this specification wherein like reference characters designate corresponding parts in the several views. Furthermore, the phraseology or terminology employed herein is for purpose of description not of limitation.

In the drawings:

FIGURE 10 is a diagrammatic illustration of a modified high pressure shell and improved heat exchange means.

FIGURE 11 is an exploded perspective view of the modified improved heat exchange means.

FIGURE 12 is a view taken along line 12—12 of FIGURE 13.

FIGURE 13 is a view taken along line 13—13 of FIGURE 12.

Reference is made to my co-pending application Serial No. 338,488, filed January 17, 1964, entitled Absorption Refrigeration System Control, for a more complete description of an absorption refrigeration system in which certain of the features therein are embodied in the present application. This application may also be referred to for a more detailed description of the operation and components of an absorption refrigeration system as the present application will only describe such system in sufficient detail to give a clear understanding of the present invention.

While the improved heat exchange means is incorporated in an absorption refrigeration system herein it will be understood by those skilled in the art that the present invention has a much wider application and may be incorporated into any other suitable system which utilizes the transfer of heat therein.

Figure 1:
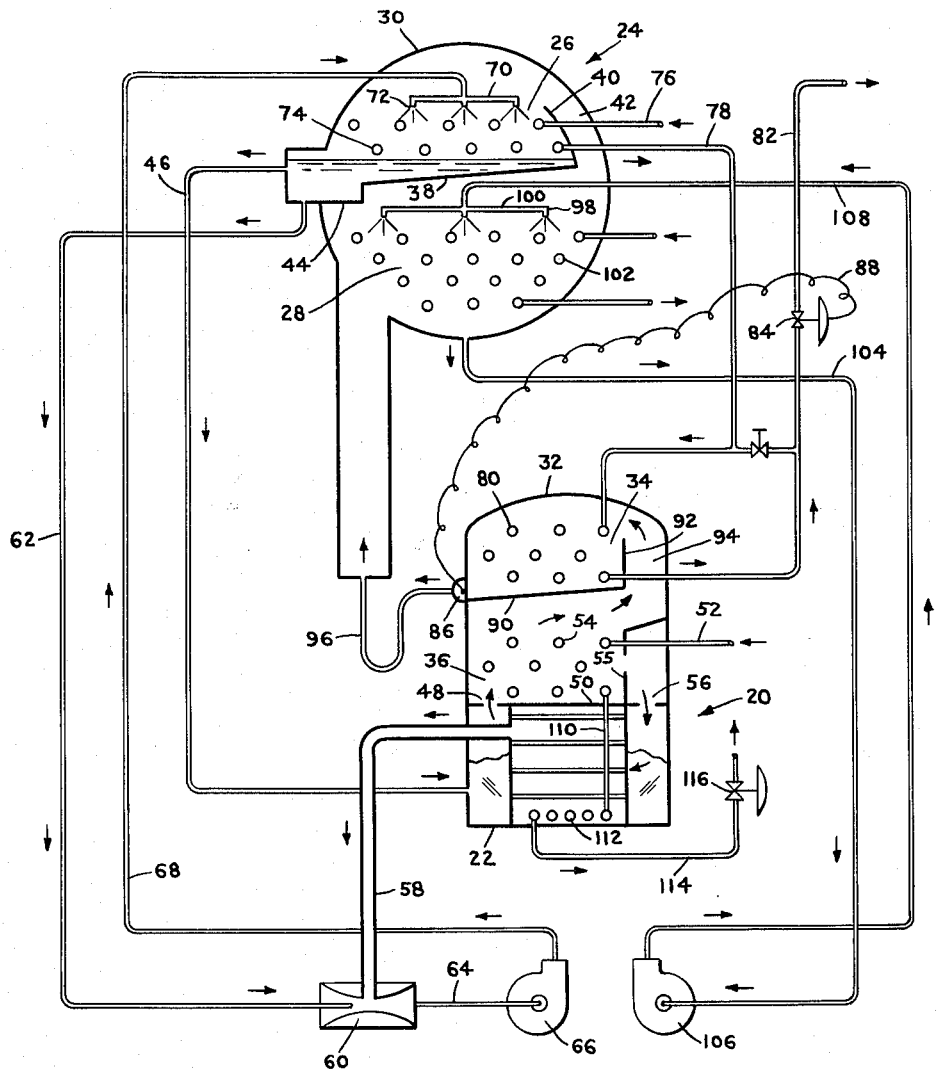
FIGURE 1 is a diagrammatic illustration of absorption system embodying the novel heat exchange means.

In the embodiment of the invention shown in FIGURE 1, the novel heat exchange means 20 is illustrated diagrammatically as heat exchanger 22 which is incorporated into absorption refrigeration system 24.

Absorption refrigeration system 24 contains a brine or saline solution which is circulated therein in varying concentrations. The brined solution is made up of a suitable mixture of an absorbent, such as lithium bromide, and a refrigerant such as water. The brine solution in the system will be referred to as a weak solution whenever it contains such a quantity of refrigerant so as to render the solution weak in absorbing properties. The brine solution in the system will be referred to as a strong solution whenever the quantity of refrigerant contained in such solution is deficient so as to enhance the refrigerant absorption properties of said solution.

Absorption refrigeration system 24, as shown in FIGURE 1, includes an absorber 26 and an evaporator 28 formed in a low pressure longitudinally extending shell 30. A high pressure longitudinally extending shell 32 is disposed below shell 30 and has disposed therein a condenser 34, a generator 36 and the heat exchanger 22.

Figure 2:
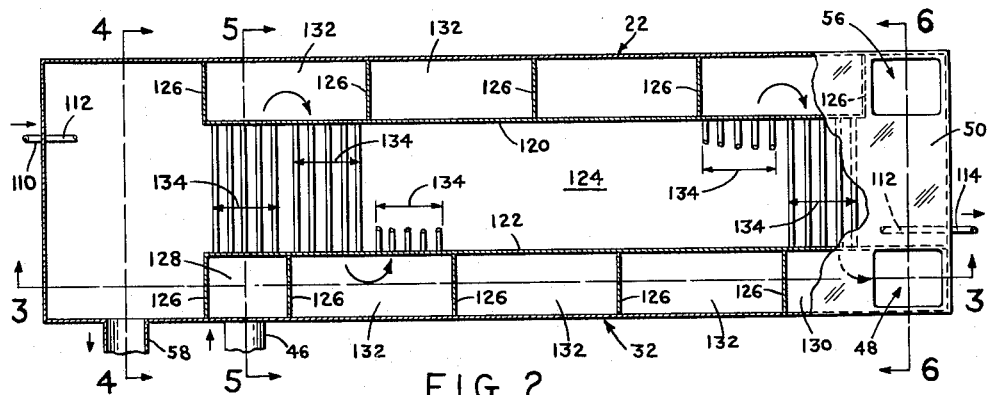
FIGURE 2 is a planned view, partially in section, of one embodiment of the novel heat exchange means.
Figure 3:
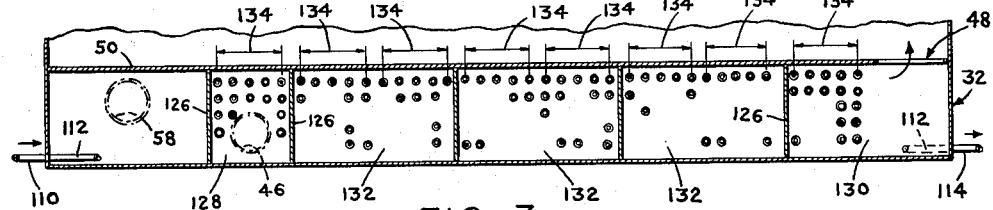
FIGURE 3 is a sectional view taken on the line 3—3 of FIGURE 2.
Figure 4:
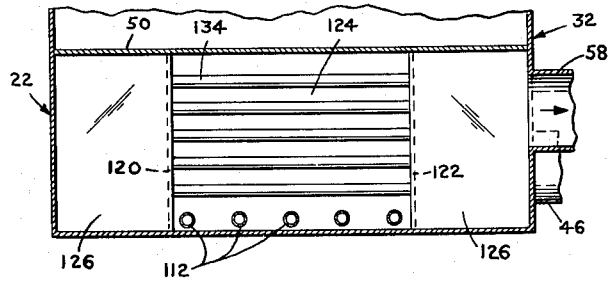
FIGURE 4 is a sectional view taken along the line 4—4 of FIGURE 2.
Figure 5:
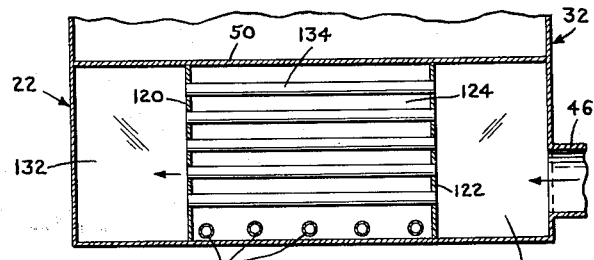
FIGURE 5 is a sectional view taken along the line 5—5 of FIGURE 2.
Figure 6:
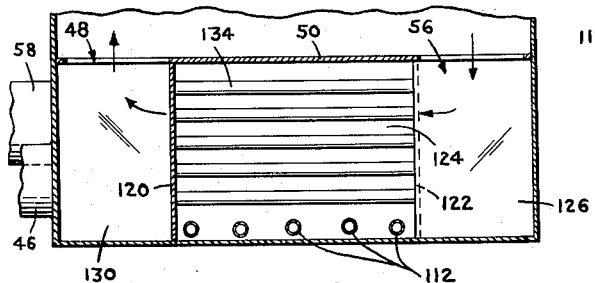
FIGURE 6 is a sectional view taken along the line 6—6 of FIGURE 2.

Shell 30 has a partition 38 extending therethrough to separate the absorber 26 from evaporator 28. One end of partition 38 has an up-turned edge 40 which defines a passage 42 between edge 40 and the wall of shell 30, and also serves as a spray guard. The other end of partition 38 has a sump 44 formed therein whereby partition 38 will serve as a liquid holding means in which the weak solution in absorber 26 may be collected. A line 46 is connected to deliver weak solution from the upper level of sump 44 through heat exchanger 22, wherein it will pass in indirect heat exchange relationship with strong solution leaving generator 36 prior to the weak solution entering the generator 36. Since the pressure of the generator 36 is substantially higher than the pressure in absorber 26, a sufficiently elevated head is required to be established in line 46 to permit the flow in the direction indicated by the arrow. The preheated weak solution will enter the greater through opening 48 of wall 50, shown in FIGURES 1 and 2, which wall separates generator 36 and heat exchanger 22.

Generator 36 includes a liquid holding enclosure maintained at a pressure of about 3.0 inches of mercury. The line 52 extends into generator 36 and connects to a heating coil or tube bundle 54 for the delivery of steam or a heated media from a suitable source (not shown). Heat is thus supplied to the generator wherein the weak solution which entered through opening 48 passes in indirect heat exchange relationship with the tube bundle 54 and be boiled so as to drive off the refrigerant vapor, which passes upwardly towards condenser 34. The weak solution entering the generator will consist of between 55% to 62% lithium bromide, and after being heated and concentrated to a strong solution it will consist of 66% to 69% lithium bromide prior to being discharged over or around duct wall 55 of generator 36 and through opening 56 wherein it will enter heat exchanger 22 to preheat the incoming weak solution. The somewhat cooled strong solution will pass from heat exchanger 22 through line 58 and be introduced into a flow mixer 60 in which weak solution is also delivered from sump 44 through line 62.

In flow mixer 60 the strong solution from line 58 and the weak solution from line 62 will combine to form a mixture of intermediate strength, which mixture will be drawn in line 64 by the suction of absorber pump 66. Pump 66 will discharge the intermediate strength solution into line 68 for delivery to spray header 70, located in absorber 26. Spray header 70 has a plurality of nozzles 72 through which the intermediate strength solution is sprayed on to the surface of absorber tube bundle 74 so as to effect a continuous absorption to maintain the absorber interior at an atmosphere of 0.3 inch of mercury.

Vaporized refrigerant enters absorber 26 through passage 42 wherein it will be absorbed into the sprayed solution through the absorption process on contact with said solution. Tube bundle 74 serves to cool the solution and remove the heat liberated to the solution when the refrigerant vapor is absorbed. Sufficient refrigerant vapor is absorbed by the sprayed solution so as to collect in sump 44 in the form of weak solution.

Cooling water enters line 76 from a suitable source (not shown) for distribution through absorber tube bundle 74 and is discharged through line 78 where it will pass to condenser tube bundle 80, in which it will condense refrigerant vapor prior to being discharged through line 82, from which it may pass to a cooling tower (not shown) for cooling and subsequent recirculation. The quantity of cooling water flowing in tube bundles 74 and 80 may be selectively regulated automatically by valve 84 which is controlled responsive to the discharge temperature from condenser 34 in a well-known manner by bulb 86 and capillary 88.

Condenser 34 is formed in shell 32 by transverse partition 90 which has one end connected to shell 32 and the other end 92 extending upwardly therefrom to form a passage 94 through which the refrigerant vapor from generator 36 will enter condenser 34. The refrigerant vapor will come in contact with condenser tube bundle 80 and be cooled and condensed thereby. The refrigerant condensate will accumulate at the bottom of the condenser and be forced by the existing pressure difference to pass through line loop 96 to evaporator 28 wherein the condensate will collect in the bottom thereof and any vapor will rise upwardly.

In evaporator 28 refrigerant is sprayed from nozzles 98 of spray header 100 over evaporator tube bundle 102 through which water passes to be chilled. The refrigerant will evaporate on the surface of the tube bundle 102 thereby taking heat from the water circulating the tube bundle 102 and chilling it. The refrigerant vapor in evaporator 28 passes through passage 42 into absorber 26. The refrigerant condensate entering evaporator 28 from line loop 96 will collect at the bottom portion thereof and will be drawn off in line 104 to the suction of refrigeration pump 106 which will return the refrigerant through line 108 for discharge through spray header 100.

Suitable purge means (not shown) may be utilized in the system to remove non-condensibles from the refrigerant.

The steam condensate in tube bundle 54 may be delivered through line 110 to a steam condensate tube bundle 112 disposed in the bottom of heat exchanger 22 wherein the condensate will be circulated and sub-cooled prior to being discharged in line 114. Regulator valve 116 is disposed in line 114 in order to control the rate of discharge of steam condensate from the system. A dual function is served by sub-cooling the condensate in tube bundle 112. Firstly, heat is added to the solution heat exchanger 22 and such heat serves to raise the temperature of the strong solution so that the possibility of crystallization taking place in the strong solution is decreased. Secondly, the condensate gives up sensible heat and by this temperature drop flashing of the condensate or discharge is prevented.

One form of the novel heat exchange means 20 is depicted in FIGURE 1, as heat exchanger 22 of the absorption refrigeration system 24 and is shown schematically as being formed in an integral structure with generator 36. FIGURES 2-6 illustrate heat exchanger 22 in greater detail enabling this embodiment in the present invention to be more clearly understood.

In the embodiment of the invention illustrated in FIGURES 1, 2, 3, 4, 5 and 6 heat exchanger 22 is formed in elongated shell 32 on the underside of wall 50. Longitudinally extending vertical partitions 120 and 122 extend substantially the length of heat exchanger 22 to form a flow-passage 124 therebetween. A plurality of transverse partitions 126 extend between partitions 120 and 122 respectively and the wall of shell 32 to form a first header 128, a last header 130, and a plurality of intermediate headers 132. A plurality of tube bundles extend from headers 128, 130, and 132 to form a multi-pass continuous flow series through flow passage 124. It is noted that a single tube bundle extends from first and last headers 128 and 130, and two tube bundles 134 extend from each intermediate header 132.

While not of conventional design, heat exchanger 22 includes a shell side and a tube side. Opening 56, flow passage 124 and the discharge line 58 define the shell side of heat exchanger 22. The tube side of heat exchanger 22 is defined by the first header 128, the last header 130, and the intermediate headers 132, which are connected in a multi-pass continuous flow series by the plurality of tube bundles 134.

The strong solution from the generator will enter the shell side of heat exchanger 22 through opening 56 and will pass in flow passage 124 in indirect heat exchange relationship with the weak solution crossing said passage in the plurality of tube bundles 134 prior to leaving heat exchanger 22 in line 58.

Conversely, weak solution will pass through the tube side of heat exchanger 22 and be pre-heated in indirect heat exchange relationship with the strong solution passing through flow passage 124. The weak solution will enter first header 128 from line 46 and successively pass through the bundles 134 and intermediate headers 132 so as to cross flow passage 124 repeatedly prior to entering last header 130 from which the pre-heated weak solution will leave the heat exchanger 22 through opening 48 and enter the generator 36 for purposes more fully described hereinbefore.

In the conventional shell and tube heat exchanger the tube side tube bundles extend longitudinally through the shell side of the heat exchange means. Such a construction results in the disadvantages set forth hereinabove. However, the improved heat exchanger 22 is able to overcome these disadvantages by providing a multi-pass tube side in which the tubes of the respective tube bundles 134 need only extend the relatively short distance between vertical partitions or tube sheets 120 and 122. Thus, the $L/D$ ratio characterizing the liquid flow through each pass of the tube side tube bundles 134 is relatively low. This is in contrast to the $L/D$ ratio which would otherwise characterize the stream flowing through the conventional longitudinally extended tube side tube bundles.

Under ideal conditions direct single pass counter-flow heat exchangers are the most efficient, but due to design or space limitations, it is not always possible to achieve this construction. However, the present improved heat exchange means 20 is able to approach the efficiency of direct single pass counterflow heat exchange while meeting the particular system limitations.

In absorption refrigeration system 24 the flow in the tube side of heat exchanger 22 may, in a reasonable design, have a Reynolds number below 2000 and, therefore, be in a region of laminar flow. By providing a plurality of substantially perpendicular extending tube bundles 134 the more favorable $L/D$ ratio gives good heat transfer even in the laminar flow region. Also there is a considerable degree of flexibility in the number of tube passes through flow passage 124 to give the desired degree of heat exchange in heat exchanger 22, consistent with the available pressure drop. Furthermore, in view of the favorable $L/D$ ratio, the tubes in tube bundles 134 may be of a smaller diameter than would otherwise be tolerable for the flow through such tubes, so as to provide an improved heat transfer coefficient for flow across the outside of the tubes on the shell side, which is favored by small diameter. This is so because for flow on the outside of tubes the heat transfer coefficient increases approximately inversely as the square root of the diameter. For example, there would be a 40% gain by going from a three-quarter inch tube diameter to a three-eighth inch tube diameter. Of course, this gain must be balanced against the most desirable $L/D$ ratio.

Eliminating the need for longitudinally extending tube bundles eliminates the necessity for intermediate tube bundles support sheets. Since the partitions 120 and 122 serve as tube sheets, they can be utilized for internal structural supports within shell 32.

Steam condensate tube bundle 112, as shown in FIGURES 1, 2, 3, 4, 5 and 6 extend longitudinally the length of flow passage 124. The steam condensate will enter tube bundle 112 from line 110 and pass through heat exchanger 22 wherein the condensate will be sub-cooled to prevent its flashing on discharge from line 114. The heat removed from tube bundle 112 serves to increase the temperature of the strong solution and prevent crystallization thereof, especially during stoppages and start-up of system 24.

Figure 7:
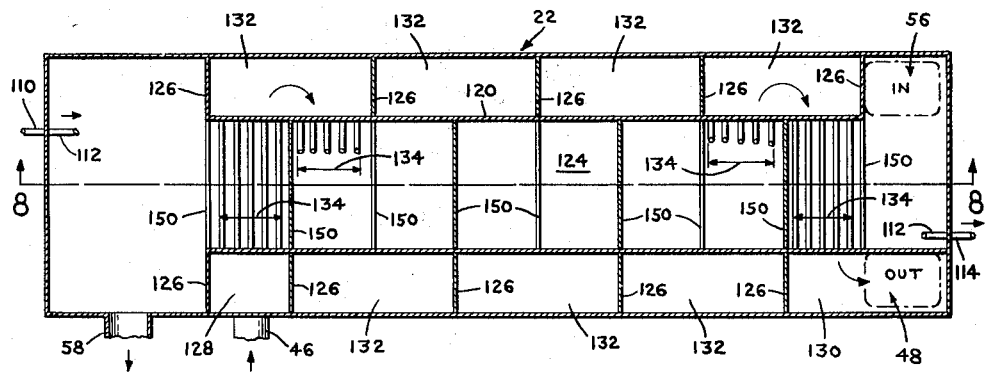
FIGURE 7 is a sectional view taken along the line 7—7 of FIGURE 8.
Figure 8:
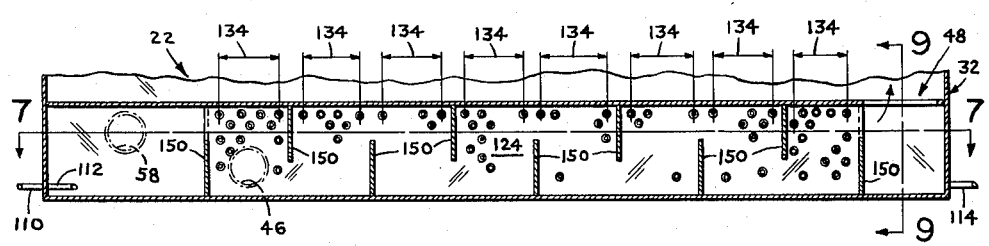
FIGURE 8 is a sectional view taken along the line 8—8 of FIGURE 7.
Figure 9:
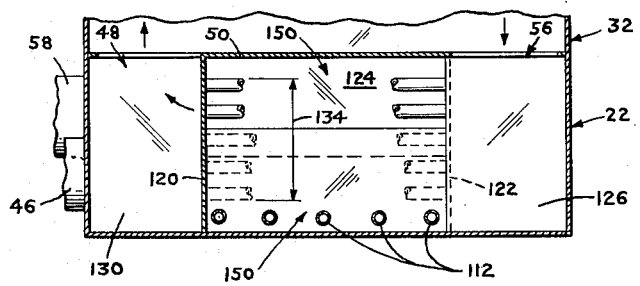
FIGURE 9 is a sectional view taken along the line 9—9 of FIGURE 8.

In the embodiment of the invention shown in FIGURES 7, 8 and 9 heat exchanger 22 is substantially identical to that shown in FIGURES 2–6, with the one exception being that a plurality of weirs 150 are disposed in flow passage 124 in spaced relationship to each other and extend alternately from the bottom and top of said flow passage. Weirs 150 will establish vapor barriers to prevent flashing of the strong solution, especially in the inlet and outlet areas and allow for variations in the liquid level at these locations due to any unbalance of pressure caused by pressure gradient or demands of system 24. Furthermore, the weirs 150 will increase the mixing of the strong solution and prevent stratification thereof into different temperature zones. Thus, the strong solution entering from generator 36 through opening 56 will be required to successfully pass over and under the alternately arranged weirs 150 prior to leaving heat exchanger 22 through line 58.

It is noted that since the tube bundles 134 extend parallel to the weirs 150, the addition of weirs 150 is greatly simplified and they need merely to suitably connected to flow passage 124. Thus no tubes need extend through them except for the relatively limited number of tubes in the steam condensate tube bundle 112.

The steam condensate tube bundle 112, contributes to certain process gains but also introduces some losses. The sub-cooling which takes place serves to increase the amount of heat supplied to the weak solution as a result of indirect heat transfer with the strong solution. Thus there is some reduction in the amount of heat that has to be supplied in the generator by the condensing steam. However, the strong solution cannot be cooled down as much as would be the case with no sub-cooling of condensate in the heat exchanger. The result is that there is an increaese of load placed on the absorber, without there being an increase in refrigeration capacity of the system. Overall the arrangement can be advantageous as compared with external condensate sub-coolers which utilize none of the heat available from the condensate.

The design of heat exchanger 22 works effectively without the condensate sub-cooling tubes, even as regards the non-crystallizing feature. It is observed that the tube sheets, 120 and 122, and the partitions 126 act as heat conduction elements to carry heat from the generator into the heat exchanger and so keep the solution above the crystallizing temperature. The rate of heat conduction is less than with the sub-cooling tubes passing through heat exchanger, but experience shows that the conduction through the metal walls would be adequate in most installations.

Another form of the invention is shown in FIGURES 10–13 in which an elongated high pressure shell 32a may be substituted for shell 32 in FIGURE 1. Shell 32a includes a condenser 34a and a generator 36a and is adapted to operate within the absorption refrigeration system 24 of FIGURE 1 substantially identical as did shell 32 with the only difference being that the novel heat exchange means is depicted in a separate heat exchanger designated generally as 200. However, heat exchanger 200 will function in a substantiatly similar manner as did heat exchanger 22. Of course heat exchanger 200 is suitable for a more general heat transfer application.

Heat exchanger 200 is especially suited for inclusion in a system for general process use. Further, regardless of the systems end use, heat exchanger 200 is readily adapted to accommodate a large range of operative pressures, from very low to extremely high. Maintenance costs are substantially lessened due to ease of assembly and disassembly and even in assembled position heat exchanger 200 can be cleaned on system shut down.

In the present embodiment heat exchanger 200 is adapted to pass weak solution from the absorber (not shown) in indirect heat exchange relationship with strong solution from generator 36a to preheat the weak solution prior to its entering the generator 36a.

Heat exchanber 200 as shown in FIGURES 10–13 has a cylindrical outer casing 202 which is formed to include a shell side 204 and a tube side 206. Partitions are suitable connected to each other and extend longitudinally in casing 202, to form the shell side 204 inwardly thereof. Inner annular plates 210 are suitable connected at either end of the partitions 208, as by welding. Accurate segments or partitions 212 are suitable connected on the flat side thereof in predetermined spaced relation to the outer side of each of the vertical partitions 208 so as to form a circular outer edge which corresponds to the circular inner edge 214. Longitudinally extending support and sealing strips 216 are connected to each of the horizontal partitions 208 wherein the lineal distance between strips 216 is substantially equal to the diameter of the inner annular plate 210. Members 208, 210, 212 and 216 will be connected as described to form an inner casing 220 as shown particularly in FIGURE 11 which has outer measurements adapted to correspond to the diameter of the edge 214 of outer casing 202 so that an inner casing 220 being disposed into outer casing 202 only small amounts of leakage will occur between the respective engaging members. However in no event will there be any leakage between the tube side 206 and the shell side 204 of the heat exchange 200. In fact the only leakage possible is on the tube side 206 and this small leakage may be allowed for by making the number of tubes per pass a smaller amount than that required when the hypothetical design leakage is zero. Such an adjustment is likely to require a slightly greater number of total passes than that used in an exchanger designed for zero pass leakage.

Outer casing 202 has annular flanges 222 formed thereon. Also suitably connected to casing 202 are tube side inlet line 46a and tube side outlet line 48a. Shell side inlet line 56a is adapted to be connected to the side of casing 202 so as to approximate counter flow conditions between the shell side 204 and the tube side 206 fluids in heat exchanger 200. Shell side inlet line 56a and shell side outlet line 58a each have an annular flange 224 thereon at the respective ends thereof adjacent the casing 202. Flanges 224 have a plurality of holes 226 and 228 circumferentially spaced to correspond respectively to holes 230 in flanges 222 of casing 202 and threaded holes 232 of inner plates 210.

Suitable securing means as shown in FIGURES 11 and 12 will operatively connect casings 202, 220 to the flanges 224. For example, on casing 220 being disposed within casing 202, inner and outer annular gaskets 234 and 236, respectively, are placed between flanges 224, and flanges 222 and end plates 210. Bolts 238 extend through holes 226 and gasket 234 into threaded engagement in holes 232 to sealingly secure the inner casing 220 and flanges 224. Radially outward thereof nuts 240 are connected to bolts 242 which extend through holes 228 and 230 and baskets 236 to sealingly secure the outer casing 202 and flanges 224.

In the conventional shell and tube heat exchanger the shell side fluid enters from the side and the tube side fluid enters from one end to flow longitudinally within the casing. However in the present invention, heat exchanger 200 permits the fluid for the shell side 204 to enter in line 56a at one end of the shell side 204 and flow in flow passage 124a wherein it will preheat the fluid passing through the tube side 206 prior to leaving heat exchanger 200 through line 58a. Fluid in the tube side 206 may enter and leave heat exchanger 200 from axially spaced lines 46a and 48a which lines may be located as shown in FIGURES 11–13 or in any other suitable or convenient manner.

In the tube side 206, partitions 212 extend between vertical partitions 208 and casing 202 to form a first header 246 adjacent inlet line 46a, a last header 248 adjacent outlet line 48a and a plurality of intermediate headers 250. Extending across flow passage 124a are a plurality of tube bundles 134a which communicate headers 246, 250 and 248 to each other to form a multi-pass continuous flow series through flow passage 124a. Accordingly, tube side fluid from line 46a enters first header 246 and passes through tube bundles 134a successively intermediate headers 250 to last header 248 from which it enters line 48a on leaving heat exchanger 200. The fluid in the tube side 206 will pass through tube bundles 134a in indirect heat exchange relationship to the fluid of the shell side 204 flowing in passage 124a. It is noted that the tube side multipass continuous flow series approximates a counter flow heat exchange.

While the heat exchanger 200 has been described in association with an absorption refrigeration system it will be understood that it is readily adaptable for any type of general or special heat transfer application.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. A closed cycle absorption system in which a saline solution is circulated therein comprising:
    (a) a condenser for receiving and condensing refrigerant,
    (b) an evaporator for receiving and evaporating refrigerant,
    (c) means communicating the condenser and evaporator in an operative group,
    (d) an absorber for increasing the refrigerant content of the saline solution therein so that it will constitute weak solution, and adapted to receive refrigerant from the evaporator,
    (e) a generator for decreasing the refrigerant content of the saline solution therein so that it will constitute strong solution, and adapted to pass refrigerant to the condenser,
    (f) conduit means communicating the absorber and the generator in an operative loop,
    (g) heat exchange means disposed in the conduit means wherein strong solution leaving the generator will pass in indirect heat exchange relationship with weak solution from the absorber,
    (h) a steam tube bundle disposed in the generator for heating the saline solution therein to vaporize a portion of the refrigerant in said solution,
    (i) a steam condensate tube bundle in the heat exchange means to pass the steam condensate in indirect heat exchange relationship with the saline solution in the heat exchange means whereby the condensate will be sub-cooled prior to discharge from the heat exchange means,
    (j) line means connecting the steam tube bundle with the steam condensate tube bundle whereby the steam condensate from the generator will pass through the heat exchange means.

2. The combination claimed in claim 1 wherein:
    (a) a pair of steam condensate headers are connected to the elongated casing in spaced relationship to each other,
    (b) the tube bundle extending substantially from one side of the casing to the other to communicate steam condensate between said steam condensate headers whereby said steam condensate will pass in indirect heat exchange relationship with said fluid in the heat exchange means to be sub-cooled therein.

3. A heat exchange means comprising:
    (a) an elongated casing having a shell side portion and a tube side portion formed therein,
    (b) the shell side portion has an inlet and an outlet means formed therein for the introduction and withdrawal of a first fluid,
    (c) a central flow passage formed in the shell side portion extending longitudinally in the casing in communicating with the inlet and the outlet of the shell side portion,
    (d) the tube side portion has an inlet and an outlet means formed therein for the introduction and withdrawal of a second fluid,
    (e) a plurality of headers formed in the tube side portion,
    (f) a first header connected to the tube side portion inlet and a last header connected to the tube side portion outlet,
    (g) a plurality of tube bundles extending transversely through the central flow passage of the shell side portion to form a multi-pass flow series and successively connect each of the headers alternately whereby the second fluid will repeatedly traverse the central flow passage of the shell side portion wherein it will come in indirect heat exchange relationship with the first fluid, (h) a plurality of weirs are connected alternately to extend from the bottom and top of the central flow passage in spaced relationship to each other, (i) the total extension of adjacent weirs to exceed the overall top to bottom dimension of the central flow passage, and (j) each pair of adjacent weirs to cooperate with each other to form a liquid seal therebetween to prevent any vapor or continuous flashing from passing the length of the central flow passage in response to the pressure gradient therein.

4. A heat exchange means for a closed cycle absorption system having an absorber, an evaporator, a generator, a condenser, and conduit means operatively connecting these components to form said system, said heat exchange means comprising:

(a) an elongated casing operatively disposed intermediate the absorber and the generator, (b) the casing having a shell side portion and a tube side portion formed therein, (c) the shell side portion in communication with the strong saline solution which flows from the generator to the absorber subsequent to passing therethrough, (d) the tube side portion in communication with the weak solution which flows from the absorber to the generator subsequent to passing in indirect heat exchange relationship with the strong solution in said casing, (e) the shell side portion having a longitudinal flow passage extending substantially the length of said casing, (f) the tube side portion having a plurality of headers formed therein, (g) the tube side portion having a plurality of tube bundles disposed transversely of the longitudinal flow passage, and successively connecting alternate headers to form a multi-pass flow series through said flow passage, and (h) a steam condensate tube bundle is disposed in said casings to pass in indirect heat exchange relationship with either the strong saline solution or the weak saline solution therein whereby steam condensate from the generator will be sub-cooled prior to discharge from the casing of the heat exchange means.

5. In an absorption refrigeration system for circulating a brine solution in a plurality of flows of varying concentrations, one of which having a Reynolds number of less than 10,000, the system having a condenser, an evaporator, an absorber, a generator and a heat exchanger means disposed intermediate the absorber and the generator, said heat exchanger means comprising:

(a) an elongated casing having a shell side portion and a tube side portion formed therein, (b) the shell side portion having an inlet and an outlet means formed therein for the introduction and withdrawal of a hot concentrated solution, (c) a central flow passage means formed in the shell side portion extending longitudinally in the casing in communication with the inlet and the outlet thereof, (d) the tube side portion having an inlet and an outlet means formed therein for the introduction and withdrawal of the solution having a Reynolds number of less than 10,000, (e) a plurality of boxlike headers formed in the tube side portion, (f) a first header connected to the inlet of tube side portion and a last header connected to the outlet of tube side portion outlet, and (g) a plurality of tube bundles extending transversely through the central flow passage means of the shell side portion to form a multi-pass flow series from alternate headers for said solution in which the boundary layer flow of each successive pass will be broken upon entering each of the headers whereby the mixing of the solution in the header will permit efficient heat transfer on each successive pass.

6. The combination claimed in claim 5 wherein:

(a) the casing defining an outer container, (b) the central flow passage means defining a removable inner container, (c) the tube bundles connected to opposite sides of the central flow passage means, (d) partition means disposed between the outer container and the inner container to form the plurality of headers, (e) closure means disposed at each end of the outer container and having an opening therethrough in communication with the central flow passage means, and (f) at least one of the closure means removeably attached to permit removal of the inner container.

7. The combination claimed in claim 5 wherein the tube bundles of the tube side portion cross the longitudinal flow passage in substantially perpendicular relationship therewith.

References Cited by the Examiner

UNITED STATES PATENTS 3,043,110  7/1962  Ahern _____ 165—145 X
3,154,930  11/1964  Aronson _____ 62—489 X

FOREIGN PATENTS 281,803  1/1914  Germany.

LLOYD L. KING, *Primary Examiner.*